United States Patent
Lindert et al.

(10) Patent No.: US 6,172,123 B1
(45) Date of Patent: Jan. 9, 2001

(54) DEMULSIFIERS FOR SEPARATING OIL AND WATER MIXTURES

(75) Inventors: Andreas Lindert, Troy, MI (US); Michael S. Wiggins, Landsdale, PA (US)

(73) Assignee: Henkel Corporation, Gulph Mills, PA (US)

( * ) Notice: Under 35 U.S.C. 154(b), the term of this patent shall be extended for 0 days.

(21) Appl. No.: 09/364,417

(22) Filed: Jul. 30, 1999

(51) Int. Cl.$^7$ .................................................. B01D 17/05
(52) U.S. Cl. ........................ 516/179; 210/708; 507/921; 516/161; 516/180; 516/191
(58) Field of Search ................................... 516/161, 179, 516/180, 191; 210/708; 523/402; 524/922; 507/921

(56) References Cited

U.S. PATENT DOCUMENTS

| | | | |
|---|---|---|---|
| 2,589,200 | * 3/1952 | Monson | 516/180 |
| 2,615,853 | * 10/1952 | Kirkpatrick et al. | 516/191 X |
| 3,272,757 | * 9/1966 | Kirkpatrick et al. | 516/179 X |
| 3,557,017 | * 1/1971 | Mange et al. | 516/180 X |
| 3,579,466 | * 5/1971 | Quinlan | 516/179 X |
| 3,900,423 | * 8/1975 | Markofsky | 516/161 X |
| 4,029,708 | * 6/1977 | Seitz et al. | 516/179 X |
| 4,059,515 | * 11/1977 | Fowler et al. | 516/180 X |
| 4,382,852 | * 5/1983 | McCoy et al. | 210/708 X |
| 4,396,530 | * 8/1983 | Duke | 516/179 X |
| 4,439,345 | * 3/1984 | Duke | 516/161 X |
| 4,502,977 | 3/1985 | Buriks et al. | 516/179 X |
| 4,626,379 | * 12/1986 | Buriks et al. | 516/179 X |
| 5,667,727 | 9/1997 | Breen et al. | 528/103 X |
| 5,684,096 | 11/1997 | Taylor et al. | 516/191 X |
| 5,753,598 | * 5/1998 | Briffett | 516/179 X |
| 5,827,453 | 10/1998 | Gross et al. | 516/134 |
| 5,877,245 | 3/1999 | Wiggins et al. | 524/366 |

* cited by examiner

Primary Examiner—Richard D. Lovering
(74) Attorney, Agent, or Firm—Wayne C. Jaeschke; Stephen D. Harper

(57) ABSTRACT

A method for preventing or breaking oil and water mixtures comprising adding thereto a branched reaction product of
A) at least one linking compound of formula I $$R^1(X)_3 \qquad (I)$$

wherein each X group is a halogen atom or one X group is a halogen atom and two X groups with two adjacent carbon atoms in the $R^1$ group and an oxygen atom from an epoxy group, and $R^1$ is an alkanetriyl group containing from 3 to 10 carbon atoms;

B) at least one compound of formula II and/or formula III $$R^2(OA)_n OH \qquad (II)$$

wherein $R^2$ is an aliphatic group containing from 3 to 36 carbon atoms, n is a number of from 0 to 200, and each OA group is independently an ethyleneoxy, 1,2-propyleneoxy, or 1,2-butyleneoxy group.

$$R^2(OA)_n NH_2 \qquad (III)$$

wherein $R^2$, OA, and n have the meanings given above for formula II; and, optionally, one or more of the following components;

C) a polyol containing at least 2 hydroxyl groups, one or more of which can be optionally alkoxylated; and D) a polyamine containing at least two amine groups, e.g. 2, 3, 4, 5 or 6 amine groups or more, and which can optionally contain alkyleneoxy groups.

28 Claims, No Drawings

DEMULSIFIERS FOR SEPARATING OIL AND WATER MIXTURES

FIELD OF THE INVENTION

This invention relates to the separation of oil and water mixtures, and more particularly to the use of demulsifiers to accomplish the separation.

BACKGROUND OF THE INVENTION

In the production of petroleum (crude oil) from underground sources, water flooding is frequently used to increase recovery of the crude oil. In addition, ground water can also be present in the crude oil deposits. It is both essentially and economically advantageous to remove the water before transporting and processing the crude oil. Separating the water from the crude oil is often time consuming and expensive due to the presence of an interlayer positioned at the interface between the oil and water layers. This interlayer is an intimate mixture of oil and water, typically a water-in-oil emulsion, and usually cannot be removed successfully by mechanical procedures such as setting, centrifuging, heat treatment, and electrical fields.

Demulsifiers have been used to aid in the collapse of this interlayer to separate the oil and water present therein with more or less success.

However, there is a continuing need for demulsifiers that are both effective and economical. Demulsifiers currently in commercial use are usually complex mixtures of ingredients, often containing cationic nitrogen compounds that significantly increase the cost of treating the interlayers.

SUMMARY OF THE INVENTION

There has now been discovered low foaming surfactants that have been found to be highly effective when used alone as demulsifiers for preventing or breaking mixtures of oil and water, and which are especially useful in preventing or breaking the above-described interlayer present between oil and water layers obtained in the recovery of petroleum crude oil from underground sources.

The surfactants used in the method of the invention are the branched reaction products of
A) at least one linking compound of formula I

  (I)

wherein each X group is a halogen atom or one X group is a halogen atom and two X groups with two adjacent carbon atoms in the $R^1$ group and an oxygen atom from an epoxy group, and $R^1$ is an alkanetriyl group containing from 3 to 10 carbon atoms;
B) at least one compound of formula II and/or formula III

  (II)

wherein $R^2$ is an aliphatic group containing from 3 to 36 carbon atoms, n is a number of from 0 to 200, preferably from 1 to 20, and each OA group is independently an ethyleneoxy, 1,2-propyleneoxy, or 1,2-butyleneoxy group.

  (III)

wherein $R^2$, OA and n have the meanings given above for formula II; and, optionally, one or more of the following components;
C) a polyol containing at least 2 hydroxyl groups, one or more of which can be optionally alkoxylated; and
D) a polyamine containing at least two amine groups, e.g. 2, 3, 4, 5 or 6 amine groups or more, and which can optionally contain alkyleneoxy groups, e.g., a polyether backbone based on ethylene oxide (EO), propylene oxide (PO), or both ethylene oxide and propylene oxide(EO/PO).

It is preferred in the above compounds that when at least one of components C) or D) is present, the ratio of moles of component A) to the sum of the OH and amine equivalents in components B), C), and D) is from 0.5:1 to 0.99:1, and more preferably from 0.8:1 to 0.95:1. However, when the reaction products contain only components A) and B) it is preferred that the mole ratio of component A) to component B) is from 0.5/1 to 5/1, preferably from 0.80/1 to 2/1.

The method of the invention is carried out by adding to an oil and water mixture a quantity of the above branched reaction product or a mixture of two or more of such products in a quantity sufficient to prevent or break the oil and water mixture into its separate components. By the term "break(ing) the oil and water mixture" is meant either complete breaking or separation of the mixture into its separate components or providing a significant reduction in the quantity of the oil and water mixture remaining after the addition of the branched reaction product(s) of the invention such that the oil and water components can be economically separated from each other for oil production.

DESCRIPTION OF THE PREFERRED EMBODIMENTS

Other than in the operating examples, or where otherwise indicated, all numbers expressing quantities of ingredients or reaction conditions used herein are to be understood as modified in all instances by the term "about".

In the above reaction products, the linking compound of formula I is preferably epichlorohydrin although other epihalohydrins can be used. Also, trihaloalkanes can be used, such as 1,2,3-trichloropropane, 1,2,4-trichlorobutane, 1,3,6-trichlorohexane, and the like. Instead of chlorine in the epihalohydrins and the trihaloalkanes, the corresponding bromine and iodine compounds can also be used, including compounds containing two or even all three of the above halogens.

The compound of formula II is an aliphatic (optionally alkoxylated) alcohol. The $R^2$ group in formula II and formula III is preferably a straight or branched chain alkyl group containing from 3 to 36 carbon atoms, more preferably from 8 to 16 carbon atoms. However, the $R^2$ group can also be a linear or branched alkenyl or alkynyl group, a saturated carbocyclic moiety, an unsaturated carbocyclic moiety having one or more multiple bonds, a saturated heterocyclic moiety, or an unsaturated heterocyclic moiety having one or more multiple bonds. The number of alkyleneoxy groups, i.e. the value for n in formula II and formula III, is preferably from 0 to 100, more preferably from 1 to 20, and most preferably from 2 to 10. The OA groups are preferably all ethyleneoxy groups.

The compounds of formula III are aliphatic (optionally alkoxylated) monoamines. These compounds can be readily prepared from the corresponding alcohols wherein the terminal hydroxy group is replaced by an amino nitrogen. For example, a compound of formula II can be subjected to a catalyzed ammoniation (with ammonia, or a lower alkylamine or lower acylamide) for replacement of the hydroxyl, or to a capping of the hydroxyl with epichlorohydrin followed by ammoniation (with ammonia, or a lower alkylamine or lower acylamide) of the resulting glycidal group.

Many of these compounds are available under the tradename Jeffamine, from Texaco Chemical Company, Houston, Tex. as the Jeffamine M series.

The polyols of optional component C) include compounds of formula IV

$$H(OA)_m—OH \qquad (IV)$$

wherein OA is as defined above for the compounds of formula II, and m is a number of from 1 to 500, preferably from 2 to 10.

Also included in the polyols of optional component C) are polyols of formula V

$$R^3((OA)_xOH)_y \qquad (V)$$

where $R^3$ is a straight or branched chain $C_3–C_{36}$ alkyl group, each OA group is independently an ethyleneoxy, 1,2-propyleneoxy, or 1,2-butyleneoxy group, each x in each y group is independently a number of from 0 to 200, and y is a number of at least 3, e.g. from 3 to 1,000, preferably from 3 to 74. In formula V, x is preferably a number of from 1 to 200 more preferably from 5 to 100, and the OA groups are preferably all EO groups. Examples of compounds of formula IV include glycerin alkoxylates, trimethylol propane alkoxylates, pentaerythritol alkoxylates, and polyvinyl alcohols, especially those of low viscosity, i.e. having a molecular weight of from 25,000 to 35,000.

The polyamines of optional component D) are preferably those of formula VI

$$H_2N(OA)_nOA—NH_2 \qquad (VI)$$

in which each A group is independently an ethylene or, 1,2-propylene group, preferably ethylene groups, and n is a number of from 1 to 200, preferably 1 to 5. Compounds of formula VI are commercially available from Huntsman Chemical Company, Houston, Texas as Jeffamine™ D and Jeffamine™ ED series.

In addition, polyamines of the formula VII are also preferred

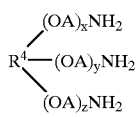

$$(VII)$$

in which $R^4$ is a straight or branched chain $C_3–C_{35}$ alkyl group, each OA group is independently an ethyleneoxy or 1,2-propyleneoxy group, and x, y, and z are each independently a number of from 1 to 200, preferably from 5 to 100. Compounds of formula VII are available from Huntsman Chemical Company as the Jeffamine™ T series. The $R^4$ group is preferably trimethylol propane or glycerin.

With respect to components A), B), C), and D), one or more of these components can be a mixture of compounds falling within the respective formulas given above.

The degree of hydrophilic and hydrophobic properties of the products used in the invention can be readily controlled by controlling the type and number of alkyleneoxy groups in component B), and in C) and/or D) when present. For example, the greater the number of ethyleneoxy groups present, the greater the water solubility, while the presence of 1,2-propyleneoxy groups for example, will decrease water solubility.

The compounds of the invention are preferably prepared in aqueous solution. These aqueous solutions typically contain from 15 to 40% by weight of solids, preferably from 20 to 40% by weight of solids.

The process used to prepare the aqueous solutions containing the compounds used in the method of the invention is preferably carried out using the following steps:

I) components B) and C) and/or D) when present, i.e. the aliphatic alkoxylated alcohol and the compound or compounds of components C) and/or D), are reacted together in the presence of an organic solvent that will azeotrope water, e.g. benzene, toluene, or xylene and in the presence of from 1 to 1.5 equivalents, based on OH and $NH_2$ groups, of an alkali metal hydroxide, preferably aqueous concentrated sodium hydroxide, or an alkali or alkaline earth metal lower alkoxide, e.g. sodium methoxide, under reflux conditions, preferably at atmospheric pressure, to remove water of reaction and any water introduced with the alkali metal hydroxide through azeotropic distillation. The reflux temperature is of course dependent on the organic solvent used in this step. The reaction is continued until substantially all of the water in the reaction mixture is removed, e.g. to a residual water content of 0.2% by weight or less. The reaction mixture is then preferably cooled.

II) component A), i.e. the linking compound of formula I, is then added to the reaction mixture from step I) and reacted at a temperature of from 60° C. to the reflux temperature of the organic solvent, preferably at a temperature of from 100 to 110° C.

III) the resulting reaction mixture is filtered to remove insoluble salts, and the organic solvent is then removed from the reaction mixture, preferably by vacuum distillation.

IV) water can then be added to the reaction product from step III) to form an aqueous solution having a solids content of from 15 to 40% by weight, preferably from 20 to 40% by weight.

Alternatively, the process can be carried out by combining steps I) and II), i.e. by mixing together components A) and B) and optionally C) and/or D) in step I.

As discussed above, the method of the invention is carried out by adding one or more of the surfactants of the invention to oil and water systems in which the oil and water are in contact with each other, or to oil and water mixtures, in a quantity sufficient to separate such mixtures into their separate components. They can be used to break both oil-in-water emulsions and water-in-oil emulsions. They are particularly useful in preventing or breaking the interlayer present between the oil and water layers obtained in the recovery of petroleum crude oil from underground sources. The demulsifiers of the invention, preferably in the form of an aqueous solution, can be injected into the oil and water systems using conventional techniques and equipment such as batch treatment, wellhead injection, or downhole injection. However, they can also be used to break other mixtures of oil and water as well, e.g. for removing suspended water in refined petroleum products.

The effective quantity of the surfactants used in the method of the invention can range from 0.01 to 5%, preferably from 0.02 to 1%, by weight, based on the weight of the oil and water system.

The invention will be illustrated but not limited by the following examples.

EXAMPLES

Example 1

A control mixture of oil and water was made from the following components:

100 ml Diesel fuel
90 ml Deionized water
10 ml conc. HCl
0.1% by wt. RODINE® 221
0.3% by wt. AQUET® X-21 Foamer

The above mixture was intensively blended for 4 minutes.

The above blended control mixture was observed over a period of 5 minutes. The mixture contained a top layer of well-defined foam, and did not separate into layers.

 RODINE® 221 is a mixture of a complex ketoamine, propargyl alcohol, fatty acid, and isopropanol.
 AQUET® X-21 Foamer is a foaming agent.

Example 2

To another sample of the blended control mixture of Example 1 there was added a 1% aqueous solution of a polysurfactant until the concentration of the polysurfactant in the blended mixture was 0.05% by weight. After a period of one minute, the blended mixture separated into two distinct layers, with a clear and definite dividing line between the layers.

 the polysurfactant is the reaction product of decyl alcohol ethoxylated with 4 ethyleneoxy groups and epichlorohydrin in which the mole ratio of epichlorohydrin to ethoxylated decyl alcohol is 1:1.1.

Example 3

To another sample of the blended control mixture of Example 1 there was added a 1% aqueous solution of polysurfactant 25363 until the concentration of the polysurfactant in the blended mixture was 0.04% by weight. After a period of one minute, the blended mixture separated into two distinct layers, with a clear and definite dividing line between the layers.

Example 4

The process of Example 3 was repeated except that the concentration of the polysurfactant in the blended mixture was 0.02% by weight. The same result was obtained as in Example 3.

Example 5

The process of Example 3 was repeated except that the concentration of the polysurfactant in the blended mixture was 0.01% by weight. The same result was obtained as in Example 3.

Example 6

The process of Example 3 was repeated except that the concentration of the polysurfactant in the blended mixture was 0.005% by weight. After 1 minute, a very thin, vague layer formed at the top. After 2 minutes the thin top layer grew to about 1.5 cm thick. After 5 minutes the top layer expanded further (2.2 cm), but there was a thin pure white layer between the top and bottom layers.

Comparative Example 1

Five control mixtures according to Example 1 were prepared, and to four of them there were added various concentrations of the demulsifier PARCOLENE® (Colloid 999), a defoaming agent. The results obtained are set forth in the TABLE below:

TABLE

| SAMPLE | TIME, IN MINUTES | RESULTS |
|---|---|---|
| Control | 0 | no separation into layers |
|  | 1 | no separation into layers |
|  | 2 | no separation into layers |
|  | 5 | very slight separation at extreme top and bottom - 99% still milky and cloudy |
| 0.05% by weight Colloid 999 | 0 | no separation into layers |
|  | 1 | no separation into layers |
|  | 2 | no separation into layers |
|  | 5 | very slight separation in extreme top and bottom - 99% still milky and cloudy |
| 0.1% by weight Colloid 999 | 0 | same results as with 0.05% by weight Colloid 999 |
|  | 1 |  |
|  | 2 |  |
|  | 5 |  |
| 0.4% by weight Colloid 999 | 0 | no separation into layers |
|  | 1 | no separation into layers |
|  | 2 | no separation into layers |
|  | 5 | very thin layer on top - clearer than the rest of the mixture |
| 0.9% by weight Colloid 999 | 0 | no separation into layers |
|  | 1 | no separation into layers |
|  | 2 | no separation into layers |
|  | 5 | thin top layer - clearer than the rest of the mixture |

What is claimed is:

1. A method for preventing formation of an oil and water mixture or breaking a mixture of oil and water comprising adding to oil and water in contact with each other or to said mixture a demulsifing effective quantity of at least one branched reaction product of A) at least one linking compound of formula I $$R^1(X)_3 \qquad (I)$$

wherein each X group is a halogen atom or one X group is a halogen atom and two X groups with two adjacent carbon atoms in the $R^1$ group and an oxygen atom form an epoxy group, and $R^1$ is an alkanetriyl group containing from 3 to 10 carbon atoms;

B) at least one compound of formula II and/or formula III $$R^2(OA)_nOH \qquad (II)$$

wherein $R^2$ is an aliphatic group containing from 3 to 36 carbon atoms, n is a number of from 1 to 100, and each OA group is independently an ethyleneoxy, 1,2-propyleneoxy, or 1,2-butyleneoxy group, $$R^2(OA)_nNH_2 \qquad (III)$$

wherein $R^2$, OA and n have the meanings given above for formula II, and optionally, one or more of the following components:

C) a polyol containing at least 2 hydroxyl groups, one or more of which can be optionally alkoxylated; and D) a polyamine containing at least two amine groups, one or more of which can be optionally alkoxylated;

wherein when the branched reaction product consists only of components A) and B), the mole ratio of component A) to component B), is from about 0.5:1 to about 5:1, and when the branched reaction product also contains at least one of components C) and/or D), the mole ratio of component A) to the sum of the OH and amine equivalents in components B), C) and/or D) is from about 0.5:1 to about 0.99:1.

2. The method of claim 1 wherein the branched reaction product consists of components A) and B).

3. The method of claim 2 wherein component A) is an epihalohydrin and component B) is at least one compound of formula II.

4. The method of claim 3 wherein in the compound of formula II the $R^2$ group is an alkyl group containing from 12 to 20 carbon atoms and the value of n is from about 80 to about 120.

5. The method of claim 1 wherein the mixture of oil and water is comprised of petroleum crude oil and water.

6. The method of claim 5 wherein the mixture of oil and water is in the form of an interlayer positioned between layers of oil and water.

7. The method of claim 1 wherein component A) is an epihalohydrin.

8. The method of claim 7 wherein the epihalohydrin is epichlorohydrin.

9. The method of claim 1 wherein component A) is a trihaloalkane.

10. The method of claim 1 wherein component B) is a compound of formula II.

11. The method of claim 10 wherein the OA groups in formula II are all ethyleneoxy groups.

12. The method of claim 1 wherein the demulsifying quantity is from about 0.01 to about 5% by weight, based on the weight of the oil and water mixture.

13. The method of claim 12 wherein said quantity is from about 0.02 to about 1%.

14. The method of claim 1 wherein component C) and/or component D) is also present.

15. The method of claim 14 wherein component C) has the formula IV

$$H(OA)_m\text{—OH} \qquad (IV)$$

wherein each OA group is independently an ethyleneoxy, 1,2-propyleneoxy, or 1,2-butyleneoxy group, and m is a number of from 1 to 500.

16. The method of claim 14 wherein component C) has the formula V

$$R^3((OA)_xOH)_y \qquad (V)$$

where $R^3$ is a straight or branched chain $C_3$–$C_{36}$ alkyl group, each OA group is independently an ethylenoxy, 1,2-propyleneoxy, or 1,2-butyleneoxy group, each x in each y group is independently a number of from 0 to 200, and y is a number of at least 3.

17. The method of claim 16 wherein in formula V, x is a number of from 5 to about 100.

18. The method of claim 17 wherein all AO groups are ethyleneoxy groups.

19. The method of claim 16 wherein y is a number of from 3 to about 1,000.

20. The method of claim 19 wherein y is a number of from 3 to about 74.

21. The method of claim 1 wherein the at least one branched reaction product is added in the form of an aqueous solution.

22. The method of claim 21 wherein the aqueous solution contains from about 15 to about 40% by weight of solids.

23. The method of claim 1 wherein in component B) the $R^2$ group is an alkyl group containing from 12 to 20 carbon atoms.

24. The method of claim 23 wherein in component B) the value for n is from 1 to about 20.

25. The method of claim 24 wherein in formula II in component B) the AO groups are all ethyleneoxy groups.

26. The method of claim 1 wherein component D) is present and has the formula VI or VII below:

$$H_2N(OA)_nOANH_2 \qquad (VI)$$

in which each A group is independently an ethylene or, 1,2-propylene group, and n is a number of from 1 to 200;

$$R^4\!\!\begin{array}{l}\diagup(OA)_xNH_2\\ \!\!\!-(OA)_yNH_2\\ \diagdown(OA)_zNH_2\end{array} \qquad (VII)$$

in which $R^4$ is a straight or branched chain $C_3$–$C_{35}$ alkyl group, each OA group is independently an ethyleneoxy or 1,2-propyleneoxy group, and x, y, and z are each independently a number of from 1 to 200.

27. The method of claim 1 wherein when the branched reaction product consists only of components A) and B), the mole ratio of component A) to component B) is from about 0.80:1 to about 2:1.

28. The method of claim 1 wherein when the branched reaction product also contains at least one of components C) and/or D), the mole ratio of component A) to the sum of the OH and amine equivalents in components B), C), and/or D) is from about 0.8:1 to about 0.95:1.

* * * * *